(12) United States Patent
Durina

(10) Patent No.: US 7,527,493 B1
(45) Date of Patent: May 5, 2009

(54) PRECISE CONTROL NON-RETURN VALVE

(75) Inventor: Michael F. Durina, Poland, OH (US)

(73) Assignee: Md Plastics Incorporated, Columbiana, OH (US)

( * ) Notice: Subject to any disclaimer, the term of this patent is extended or adjusted under 35 U.S.C. 154(b) by 0 days.

(21) Appl. No.: 11/933,608

(22) Filed: Nov. 1, 2007

(51) Int. Cl.
*B29C 45/60* (2006.01)

(52) U.S. Cl. ............... 425/562; 425/559; 425/564; 366/80; 366/82

(58) Field of Classification Search ............ 425/562, 425/564, 559, 382.4; 366/80, 82; 251/121; 137/614.16
See application file for complete search history.

(56) References Cited

U.S. PATENT DOCUMENTS

| | | | | |
|---|---|---|---|---|
| 4,112,516 A | * | 9/1978 | Hotz | 366/80 |
| 4,377,180 A | * | 3/1983 | Biljes | 137/528 |
| 4,512,733 A | * | 4/1985 | Eichlseder et al. | 425/207 |
| 4,643,665 A | * | 2/1987 | Zeiger | 425/563 |
| 4,850,851 A | * | 7/1989 | Dinerman | 425/562 |
| 5,112,213 A | * | 5/1992 | Oas | 425/562 |
| 5,164,207 A | * | 11/1992 | Durina | 425/382.4 |
| 5,182,118 A | * | 1/1993 | Hehl | 425/192 R |
| 5,246,660 A | * | 9/1993 | Tsutsumi | 264/328.17 |
| 5,439,633 A | * | 8/1995 | Durina et al. | 264/328.17 |
| 5,441,400 A | * | 8/1995 | Zeiger | 425/562 |
| 5,518,394 A | * | 5/1996 | Shiozawa et al. | 425/562 |
| 5,670,112 A | * | 9/1997 | Csongor et al. | 264/572 |
| 6,227,841 B1 | * | 5/2001 | Viron | 425/563 |
| 6,270,703 B1 | * | 8/2001 | Wildman et al. | 264/39 |
| 6,464,488 B2 | * | 10/2002 | Dray | 425/562 |
| 6,499,987 B1 | * | 12/2002 | Durina et al. | 425/192 R |
| 6,554,603 B1 | * | 4/2003 | Schreiner et al. | 425/559 |
| 6,585,001 B2 | * | 7/2003 | Gatti | 137/533.27 |
| 6,857,867 B2 | * | 2/2005 | Schimmel | 425/559 |
| 2005/0233020 A1 | * | 10/2005 | Manda et al. | 425/146 |
| 2006/0164911 A1 | * | 7/2006 | Nikolai et al. | 366/82 |

* cited by examiner

*Primary Examiner*—Yogendra Gupta
*Assistant Examiner*—Emmanuel S Luk

(57) ABSTRACT

An improved precise control non-return valve assembly which is mounted on the front end of a helical rotating plasticating screw of an injection molding machine or the like that is surrounded by a heated elongated barrel and end-cap that forms a distribution chamber, whose purpose is to allow means for passage of molten plastic fluid in the downstream direction while preventing it in the opposite direction. The valve having an outwardly extended portion of a shaft and has a means to accept a ring that is sandwiched between a bushing assembly and a rear seating area. The bushing assembly consists of at least two bushings and one pin whose dual purpose is to govern the forward movement of the ring and to absorb the force that is being applied to it. The non-return valve assembly when moved forward with the screw, forms a seal, builds pressure, and displaces molten plastic fluid from the distribution chamber through a discharge chamber passageway and into a mold.

6 Claims, 4 Drawing Sheets

PRECISE CONTROL NON-RETURN VALVE

FIELD OF THE INVENTION

This invention relates to a plastic extruder and more particularly this invention relates to a non-return shutoff valve for controlling flow of molten plastic fluid through a discharge chamber passageway and into a mold.

BACKGROUND

Description of Prior Art

The manufacturing process of injection or blow molding is a primary form of manufacturing of plastic products in the world today. The demands of high molded part tolerances, dimensional stability, and shot-to-shot repeatability are increasing and better controls and mechanical components of the injection machines are required to meet the demands. A major component that contributes to this process of improvement is the plasticating unit and specifically, the non-return valve which is one of the components of the unit. The non-return valve controls the volume of molten plastic material that is injected into the mold. Any imperfection in the operation of this component is reflected in the molded part. Imperfect molded parts cost the industry billions of dollars per year. An improvement in the non-return valve is needed to eliminate imperfect molded parts.

Injection Molding machines of the type in which the invention pertains to generally comprises an elongated helical plasticating screw which rotates and reciprocates axially in a cylindrical bore of an elongated heated barrel for moving heated plastic material along the helical flight channels of the screw, from an inlet port to a discharge port where it is injected from a distribution chamber, through a nozzle and into a mold. The flow of the molten plastic material into the distribution chamber for subsequent discharge through the nozzle is controlled by the non-return valve.

With the sliding ring design, U.S. Pat. Nos. 4,105,147 (1977), 4,643,665 (1985), 5,112,213 (1991), 4,850,851 (1989), 4,681,528 (1987) as examples, the sliding ring becomes the shutoff mechanism which when the helical screw moves foreword to displace plastic into the mold, engages with and forms a seal with the rear seating area. The ring, hereby referred to as the shutoff mechanism, is free to float and is not connected to the helical screw or fluted retaining device but is sandwiched between these components with the ability to move axially. This shutoff mechanism forms a fit within close proximity to a heated barrel to form a gap. Having a free floating unattached shutoff mechanism that is not connected to and does not rotate with either the helical screw or retaining device and that is the component that forms the gap, is desirable for precise non-return valve operation.

Common problems associated with non-return valves of this type are; a) the retaining device areas that are designed to govern the forward movement of the shutoff mechanism during screw rotate, are forced against each other with a substantial amount of hydraulic pressure, viscous drag and high rotational speeds causing them to wear adhesively. As wear occurs, the functionality of the valve begins to diminish, creating more imperfect products b) the inability of the non-return valve and specifically, the shutoff mechanism to shutoff completely over a range of viscosities that is normally seen in a day-to-day operation of an injection molding plant c) the inability to replace the worn front retaining device area and ring without completely dismantling the non-return valve from the screw and or completely replacing the valve.

SUMMARY OF THE INVENTION

The plastic extruder of this invention comprises a rotating helical screw within a cylindrical barrel of the type which is used to feed molten plastic to a high pressure injection or blow molding apparatus. The plastic extruder and injection apparatus operate sequentially. First the plastic extruder, by rotation of the helical screw forces molten plastic fluid through the flight channel to the non-return valve of this invention. As the molten resin is pumped through the valve volume is displaced within the cylinder that is closed at the discharge end which forces the helical screw to retract. When the screw retracts to a pre-set position, screw rotation is stopped. The helical screw and non-return valve apparatus are then moved forward axially which urges the shutoff mechanism to mate with the rear seat sealing area to form a seal and displace the molten plastic fluid into the mold.

BRIEF DESCRIPTION OF THE DRAWINGS

The invention will be more clearly understood by reference to the attached drawings in which.

DESCRIPTION OF THE PREFERRED EMBODIMENTS

Figure 1:
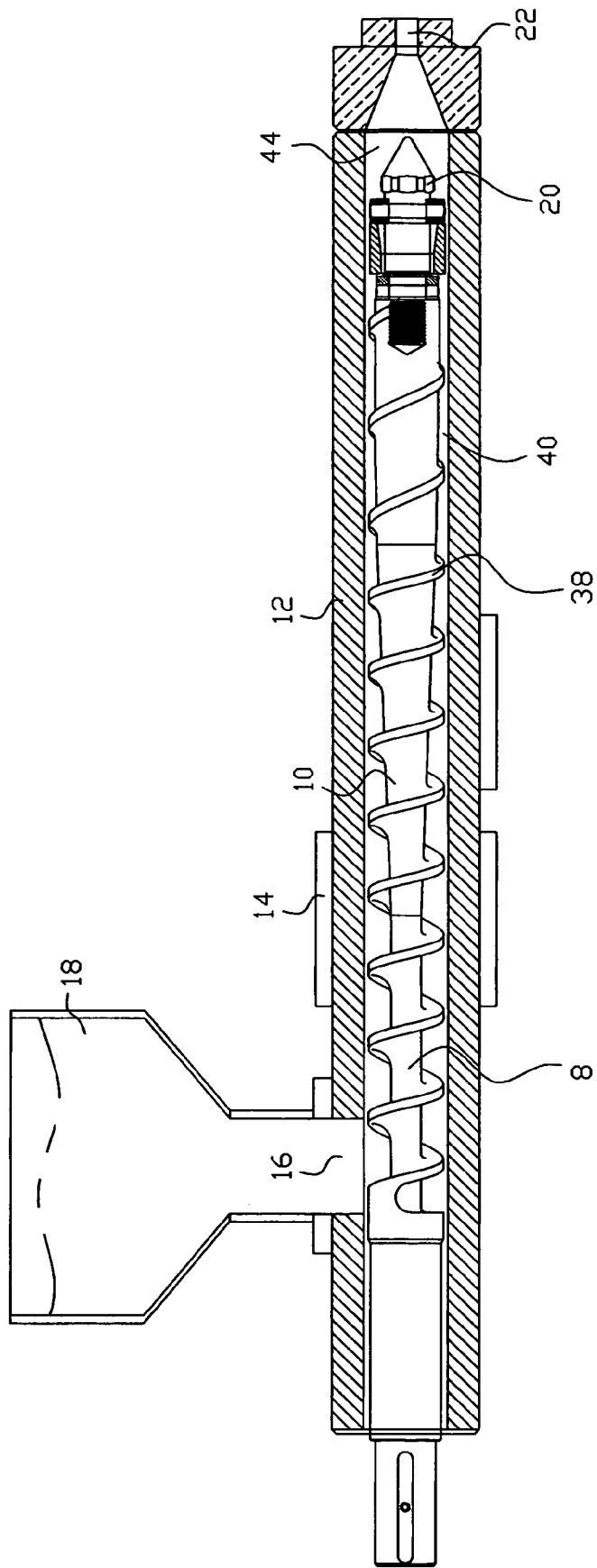
FIG. 1 is a cross sectional view of the plasticating unit of an injection molding machine including a hopper, heated barrel, helical screw, screw flight, flight channel, discharge passageway and the invention, a precise control non-return valve.

FIG. 1 represents a cross sectional view of a plasticating unit for an injection molding machine. The plasticating unit includes a heated elongated barrel 12 enclosing a reciprocating and rotating helical screw 10 which is fed plastic pellets through a material hopper 18 filled with solid resinous material particles and an inlet port 16 for admission of one or more solid particulate resinous materials and any required additives or agents. The screw 10 comprises a helical flight 38 that wraps around a core 8 that forms a channel 40 for conveyance of the plastic pellets from the inlet section along the axis while the apparatus is heated by heaters 14 so that the pellets become melted during transit within barrel 12. This operation and apparatus is described more fully in U.S. Pat. No. 4,752,136.

The precise control non-return valve of the invention is located at the forward end of the rotating screw 10. The screw is shown with a means for attachment of said non-return valve 20; said valve is in the open position and is dictated generally at 20 in FIG. 1. The non-return valve is shown in the open position moving downstream to a discharge passageway 22. The molten plastic fluid discharges through the passageway and into a mold that is not shown.

Figure 2:
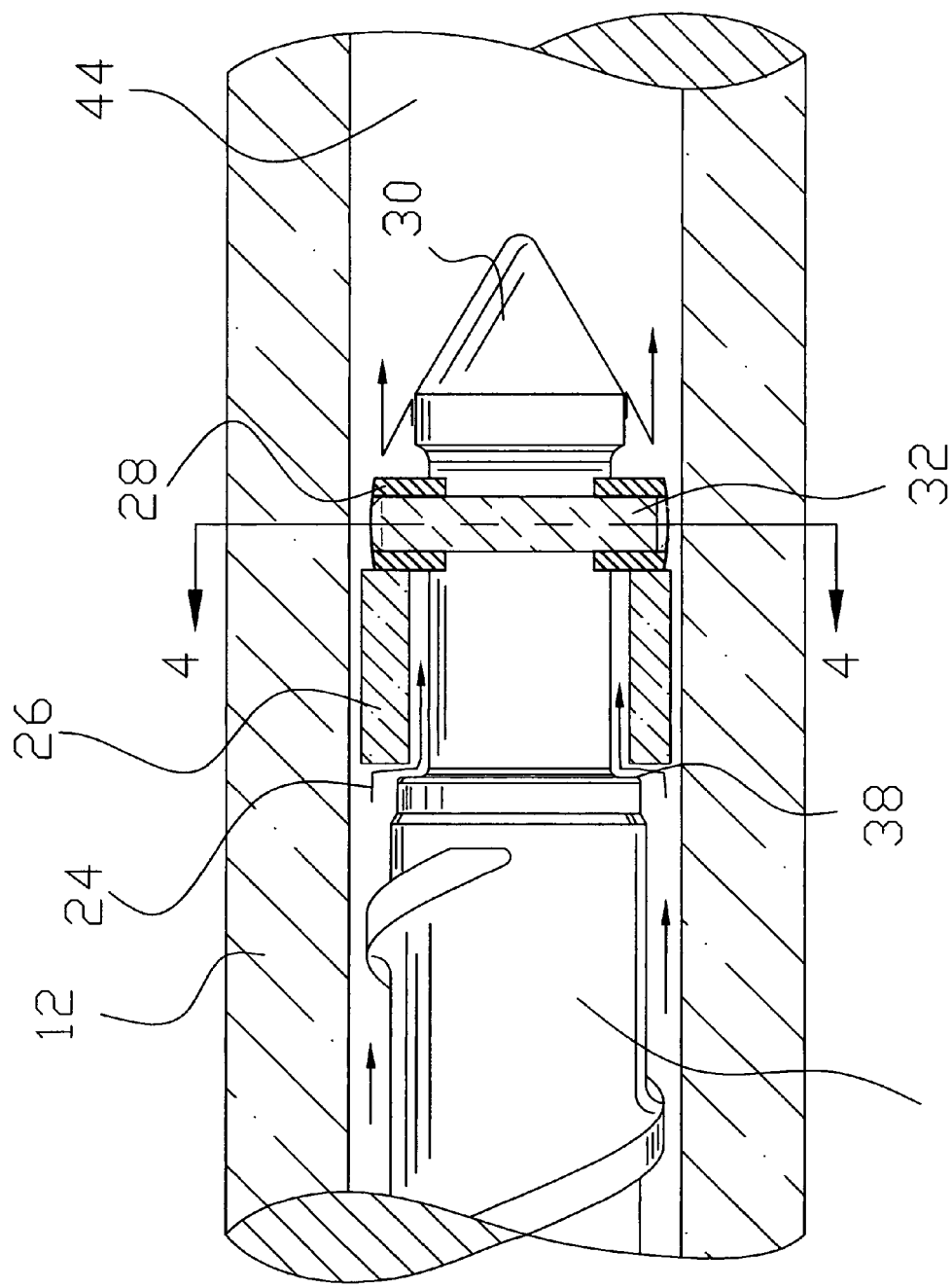
FIG. 2 is a cross sectional view of the barrel and precise control non-return valve assembly in the open position showing the screw and shaft as an integral component, the ring, retaining bushing assembly consisting of a pin and two bushings, and the flow direction of the molten plastic fluid.

The precise control non-return valve of the invention in FIG. 2 is shown with the shaft 30 as being integral with the screw 10 whereas the shaft extending telescopically forward has a means for attachment of a retaining bushing assembly which consists of a pin 32 and two bushings 28 that are positioned to govern the forward axial movement of a ring 26 that is shown in the open position and allowing molten plastic fluid to flow between the rear seat sealing area 42 and said ring as depicted by flow lines 24 and then between the ring 26 and shaft 30 and through the valve to the waiting chamber 44 of the barrel 12.

Figure 3:
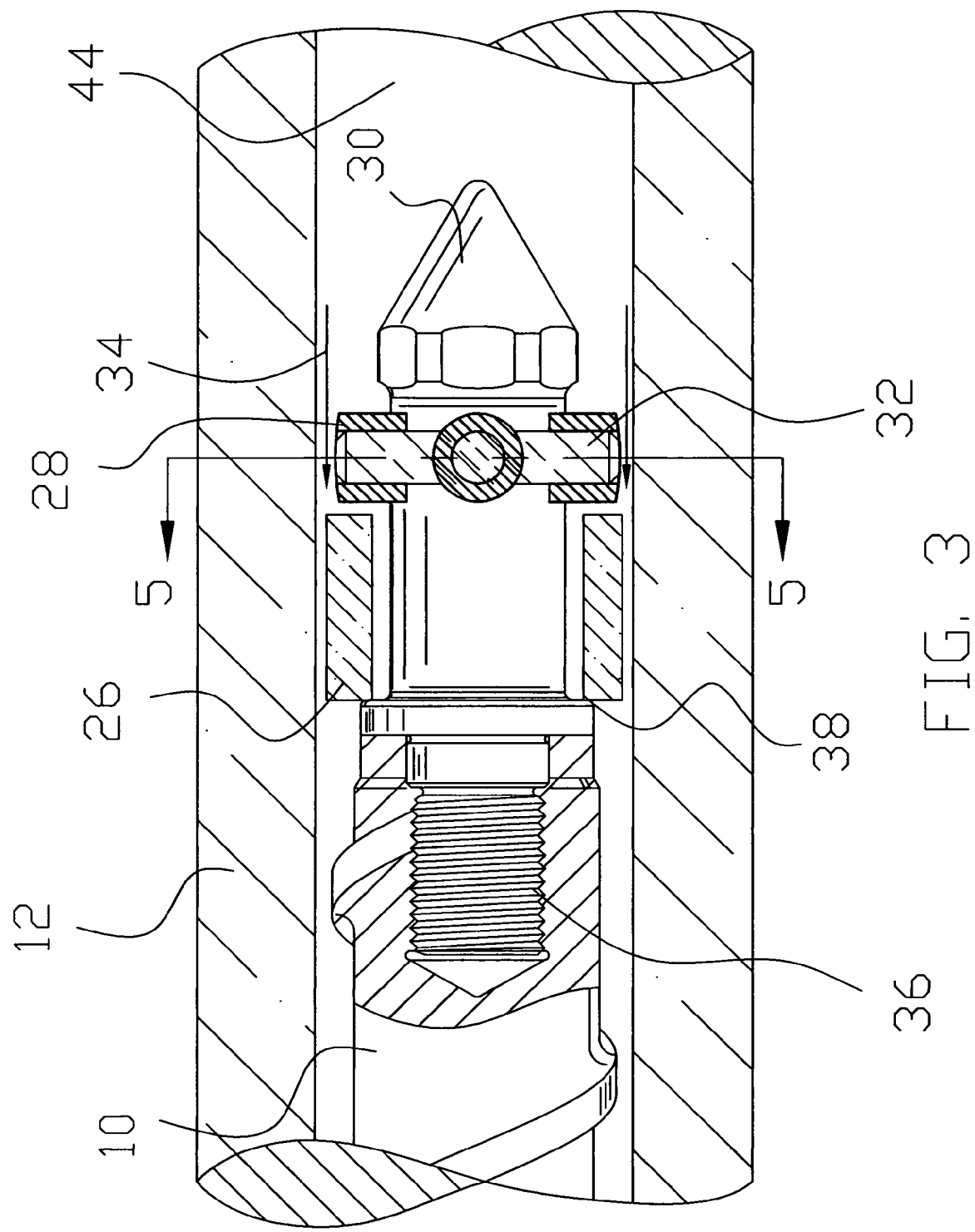
FIG. 3 is a cross sectional view of the barrel and precise control non-return valve assembly in the closed position showing the screw and shaft as a separate component with the rear seating area integral with the shaft, the shaft and screw having a means for attachment, the ring, retaining bushing assembly consisting of a multiple pins and bushings, and the flow direction of the molten plastic fluid.

The precise control non-return valve of the invention in FIG. 3 is shown with the shaft 30 as being a separate component from the screw 10 and having a threaded means for attachment 36 to said screw 10, the rear seat sealing area 42 of the shaft is shown as an integral part of said shaft 30 with the ring in the closed position and the molten plastic fluid not allowed to flow upstream as shown by the flow lines 34, the shaft extending telescopically forward has a means for attachment of multiple retaining bushing assemblies which consists of multiple pins 32 and bushings 28 that are positioned to govern the forward axial movement of said ring 26 of the valve. The valve while being in the closed position is ready to move molten plastic fluid that is not shown in the chamber 44 of the barrel 12 into the mold that is not shown.

Figure 4:
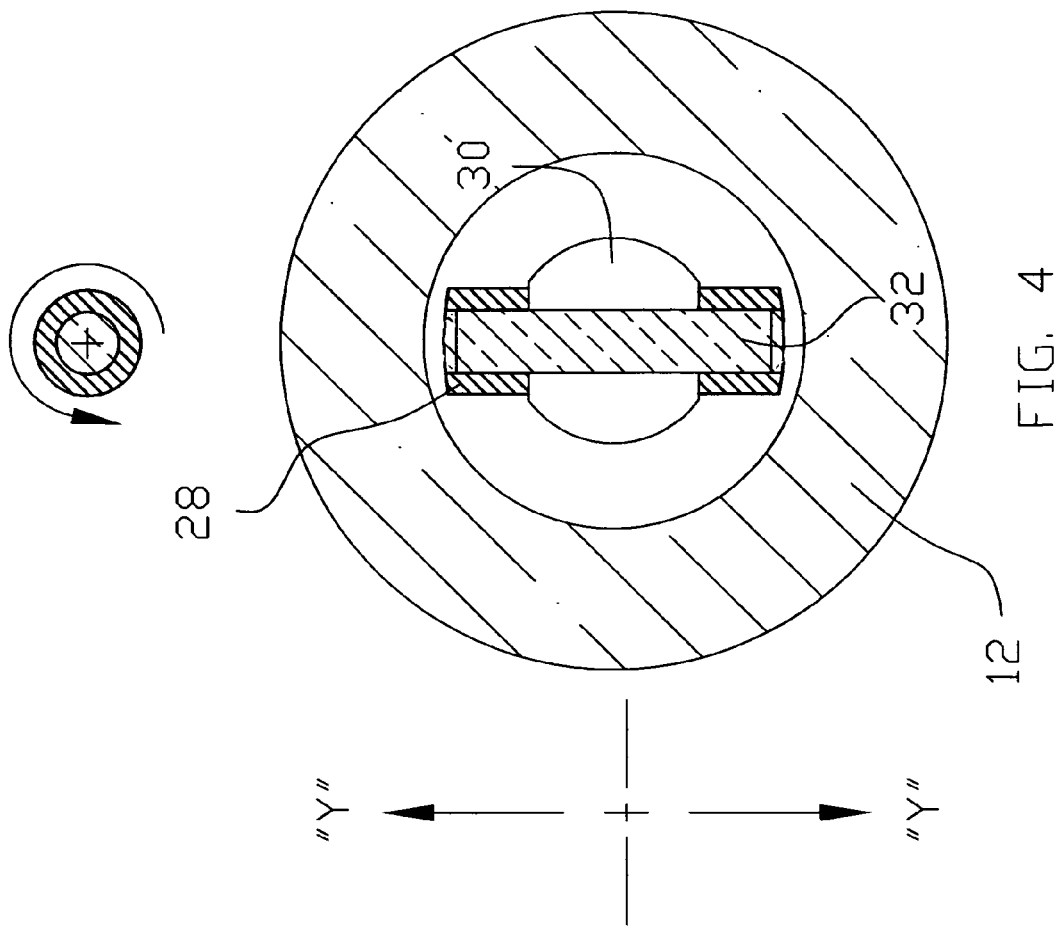
FIG. 4 is a sectional view of FIG. 2 showing a shaft and retaining bushing assembly in the simplest form consisting of one hardened pin and two bushings with it's proximity to the inside diameter of the barrel and shaft that govern the movement of the bushings in the "Y" direction.
Figure 5:
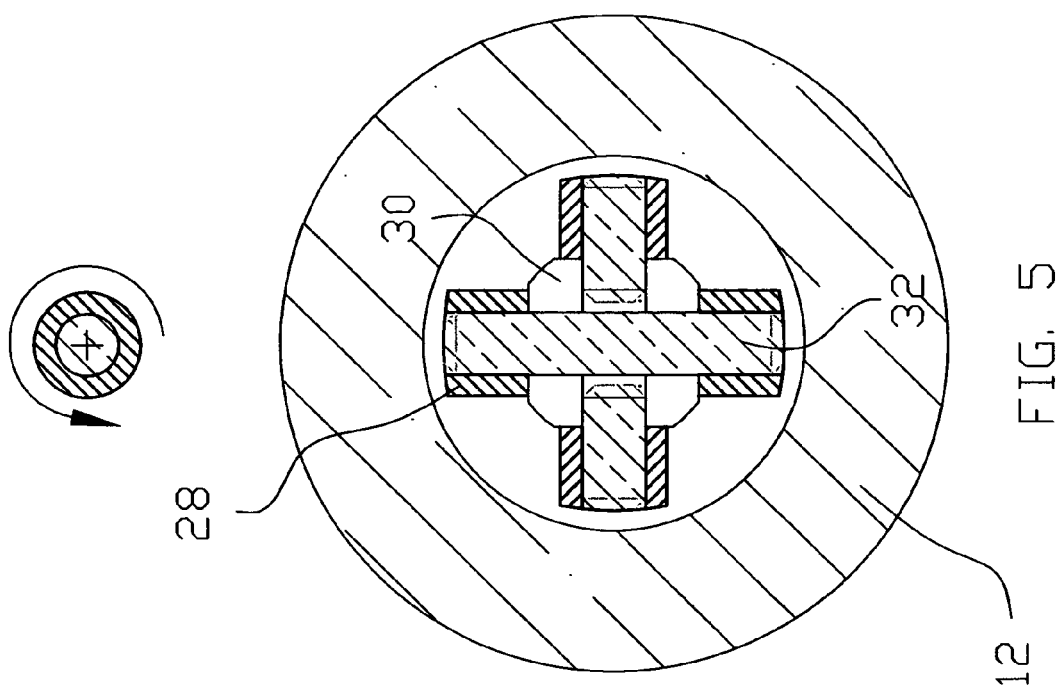
FIG. 5 is a sectional view of FIG. 3 showing a shaft and multiple retaining bushing assemblies consisting of multiple hardened pins and multiple bushings with it's proximity to the inside diameter of the barrel and shaft that govern the movement of the bushings in the "Y" direction.

The precise control non-return valve of the invention in FIG. 4 is showing the sectional view of FIG. 2, the shaft 30 and bushing assembly whereas the retaining bushing assembly is in it's simplest form, with one pin 32 and two bushings 28 with the shaft 30 having a means for attachment of said pin 28 and the bushing assembly's proximity to the inside diameter of the barrel 12 that governs the movement of the bushing 28 along with the shaft 30 in the "Y" direction;

The precise control non-return valve of the invention in FIG. 5 is showing the sectional view of FIG. 3, with multiple retaining bushing assemblies consisting of multiple shafts 30 and bushings 28 whereas the bushing assemblies have a means for attachment to said pin 28 and the bushing assembly's proximity to the inside diameter of the barrel 12 that governs the movement of the bushings 28 along with the shaft 30 in the "Y" direction;

Operation

The functioning of the injection molding machine, the plasticating unit and specifically the non-return valve of this invention are briefly described as such: The screw 10 rotates and accepts plastic pellets 18 through a feed opening 16 and flight channel 40 which conveys material forward along said flight channel 40 that is formed along with the barrel 12. The plastic pellets while being conveyed, picks up energy from shear and the heaterbands 14 becoming mostly molten and fluid, and is pumped through said non-return valve 20 into a distribution chamber 44, displacing volume and reciprocating rearward to a predetermined set point where screw 10 rotation stops. The mold that is not shown and being empty, is filled when the screw 10 is moved forward, and a seal is created by said non-return valve 20. The preciseness of the screw movement and the non-return valve functioning determine the molded part quality. For this reason, said non-return valve is vital to this operation and an improvement is welcome and needed.

As the molten plastic fluid is conveyed downstream to the end of the screw 10, it confronts with the rear projected area of the ring 26 which is a free floating un-attached shutoff mechanism, and has a tight fit with the barrel 12. The pressure of the fluid urges the ring 26 to separate from the seat sealing area 38 creating a passageway for the fluid to flow through the valve into the awaiting chamber 44 which displaces volume which causes the screw 10 to reciprocate rearward. It is known by those skilled in the art that the screw 10 turns at a rate of speed that is different than the ring 26 and the ring 26 is forced against the retaining device with a substantial amount of pressure with the face of the ring 26 sliding against a complimentary face of the retaining device. Prior art deals with this sliding wear problem by enhancing the wear ability of the metal components. With our invention, the ring 26 that is forced against the bushing assembly retaining device transforms the force of the ring 26 to the bushing 28 causing the bushing 28 to rotate about the axis of the pin 32 and to absorb the total force. The pin 26 in our invention is preferably in a stationary position and is fixed to the shaft 30 by an interference fit. The bushing 28 is free to rotate about the axis of the pin 26, the fit being in close proximity to the pin so as not to allow access of the molten plastic fluid to enter between the two members. Therefore, the sliding wear mechanism has been transformed into a spindle mechanism which has the affect to distribute the load over the total inside circumferential area of the bushings. By transforming the sliding force between the ring 26 and the retaining device to the bushing assembly has substantially affected the wear ability between these two members.

After the screw 10 has returned rearward to a preset position and stopped, the screw 10 is ready to move forward to displace molten plastic fluid into the awaiting mold. As the screw 10 moves forward, the shaft 30 that is attached to or integral with said screw 10 is moved independent of the ring 26 that because of it's close proximity to the barrel 12 is urged to stay in position so that the rear seat of the ring and the seat of the valve 38 touch, form a seal, and precisely displace the fluid into the mold.

The features of said invention including; a shutoff mechanism 26 that is free floating and un-attached, a bushing assembly that is novel in it's application and is able to transform a notorious problem of sliding wear between two components into a spindle mechanism, a bushing assembly that is easily replaceable and does not need to have the screw 10 or the valve assembly 20 removed to replace, and an improved flow and pressure differential across the ring 26 as a result of our unique retaining bushing assembly will substantially improve the operation of this most critical component.

I claim:

1. A precise control non-return valve assembly for an injection molding machine, said molding machine comprised of an elongated helical plasticating screw that rotates about an axis and reciprocates along said axis within a heated barrel, to discharge molten plastic material through said non-return valve at a discharge end of said screw, said non-return valve assembly comprising:

a) moving from upstream to downstream, an outwardly extending shaft that is integral with or has a means for attachment to said screw that is preferably diametrical in shape said shaft having a means for attachment for a hardened pin with a conical portion at the distal end that is designed to match the cone of an discharge chamber passageway;

b) a rear seating area that is integral with or mates up with the face of said plasticating screw and allows passage of molten plastic material between it and a ring;
c) a ring that is a free rotating un-attached shutoff mechanism whose inner and outer periphery is diametrical in shape and fits with minimal clearance between it and said heated barrel, that is sandwiched between said rear seat and a bushing assembly that is positioned downstream of said screw and rear seating area;
d) a pin that fits snugly into a machined hole in said shaft that protrudes above the surface of the shaft and is designed to accept a hardened bushing that is slipped over the top of the pin to form a bushing assembly;
e) a bushing assembly that is positioned such so as to govern the forward downstream movement of said ring that is sandwiched between it and said rear seating area;
f) a bushing assembly that consists of at least two bushings and a hardened pin whereas the bushing that is cylindrical in shape with an inside diameter that fits in close proximity to the outside diameter of said pin but is free to spin about the axis of the pin, said bushing is free to spin about said hardened pin but is governed in movement on the "Y" axis by said shaft and the barrel inside diameter.

2. The positive control non-return valve of claim 1 wherein said bushing assembly consists of at least two bushings and one pin.

3. The positive control non-return valve assembly of claim 2, wherein said shaft and said rear seating area are integral with said screw.

4. The positive control non-return valve assembly of claim 1, wherein said shaft is separate from said screw and has a means for attachment to screw.

5. The positive control non-return valve assembly of claim 4 wherein said rear seat is integral with shaft.

6. The positive control non-return valve assembly of claim 1 wherein said rear seat and shaft are separate components and shaft has a means for attachment to said screw.

* * * * *